(12) United States Patent
Abbas

(10) Patent No.: US 7,277,459 B1
(45) Date of Patent: Oct. 2, 2007

(54) DATA TRANSMISSION IN AN SDH NETWORK

(75) Inventor: Ghani A. M Abbas, Nottingham (GB)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 09/144,782

(22) Filed: Sep. 1, 1998

(30) Foreign Application Priority Data

Sep. 5, 1997 (GB) .................................. 9718831.2

(51) Int. Cl.
*H04J 3/02* (2006.01)

(52) U.S. Cl. ....................................... 370/539; 370/541

(58) Field of Classification Search ................ 370/465, 370/466, 907, 503, 505, 516, 517, 537, 539, 370/395, 391, 392, 394, 395.1, 352, 414, 370/476, 389, 244, 468, 357, 474, 395.5, 370/395.51, 395.52, 395.6, 395.64, 535–545; 714/752, 49, 39; 341/94; 709/217, 219, 709/203, 224, 225; 707/1, 10
See application file for complete search history.

(56) References Cited

U.S. PATENT DOCUMENTS

| | | | |
|---|---|---|---|
| 4,967,405 A | 10/1990 | Upp et al. | |
| 5,168,494 A | 12/1992 | Mueller | |
| 5,461,622 A * | 10/1995 | Bleickardt et al. | .......... 370/470 |
| 5,588,000 A * | 12/1996 | Rickard | ....................... 370/428 |
| 5,793,760 A * | 8/1998 | Chopping | .................... 370/355 |
| 6,011,802 A * | 1/2000 | Norman | ...................... 370/466 |
| 6,058,119 A * | 5/2000 | Engbersen et al. | ......... 370/466 |
| 6,118,795 A * | 9/2000 | Fukunaga et al. | .......... 370/503 |
| 6,157,658 A * | 12/2000 | Toyoyama et al. | .......... 370/505 |
| 6,256,292 B1 * | 7/2001 | Ellis et al. | ................... 370/227 |

FOREIGN PATENT DOCUMENTS

| | | |
|---|---|---|
| GB | 2 310 971 A | 9/1997 |
| WO | WO 96/33563 | 10/1996 |

OTHER PUBLICATIONS

ITU-T, Telecommunication Standardization Sector of ITU-T,Network Node Interface for SDH, G.707 ,Mar. 1996.*

* cited by examiner

*Primary Examiner*—Ajit Patel
(74) *Attorney, Agent, or Firm*—Kirschstein, et al.

(57) ABSTRACT

A method for the transmission of data in a synchronous digital hierarchy (SDH) network comprising the steps of transmitting to a node of the network a form of data signal from outside the network, converting the signal into a to a virtually concatenated information structure and transporting the signal through the network in the virtually concatenated information structure; means for carrying out the method and tributary cards arranged and configured to process signals received in contiguously concatenated form to convert them into virtually concatenated form for transfer across the network; thus providing for data transmitted in high-bandwidth, contiguously concatenated signals (ie VC-4-4c) to be transported across a SDH network, not itself capable of carrying contiguously concatenated signals.

28 Claims, 3 Drawing Sheets

DATA TRANSMISSION IN AN SDH NETWORK

BACKGROUND OF THE INVENTION

1. Field of the Invention

The present invention relates to the field of synchronous digital hierarchy (SDH) networks and data transmission therein.

2. Description of the Related Art

In SDH data is transferred in information structures known as virtual containers. A virtual container (VC) is an information structure within SDH which consists of an information payload and path overhead (POH). There are two types of VC: low order (LOVC) and high order (HOVC). LOVC's (eg. VC-12, VC-2 and VC-3) are for signals of less than 140 Mb/s and HOVC's (ie. VC-4) are for 140 Mb/s signals.

With the ever increasing demand for higher data rates there is a continuing need to improve the data transfer capability of networks such as those based on SDH. One way of providing higher bandwidth is concatenation.

Concatenation is a method for the transport over SDH networks of a payload of a bandwidth greater than the capacity of the defined information structures. ITU standard G.707 defines concatenation as follows: a procedure whereby a multiplicity of virtual containers is associated one with another with the result that their combined capacity can be used as a single data container across which bit sequence integrity is maintained. Two types of concatenation have been proposed: contiguous and virtual.

Contiguous concatenation is defined in ITU standards such as G.707. Virtual concatenation for VC-2 has also been identified in ITU G.707 but the means for implementing it has not previously been defined and it has therefore not been implemented. Virtual concatenation for VC-4 has been proposed as a concept but no way of implementing has been devised until now. Furthermore, no method of performing conversion between contiguously concatenated signals and virtually concatenated signals has been defined.

Contiguous concatenation uses a concatenation indicator in the pointer associated with each concatenated frame to indicate to the pointer processor in the equipment that the VC's with which the pointers are associated are concatenated. For example, by contiguously concatenating four VC-4's an information structure with a data rate equivalent to a VC-4-4c could be created. The resulting VC-4-4c equivalent signal has only one path overhead (i.e. 9 bytes only). However many installed SDH networks cannot carry out the necessary processing to support contiguous concatenation. In order to implement contiguous concatenation in such SDH networks it would be necessary to modify the hardware of the equipment in order to handle the concatenated signal. Suitable modification of such a network would be prohibitively expensive.

This can cause a problem when the customer wishes to transfer data which requires a bandwidth too high for the installed SDH network to handle, such as some broadband services. For example a customer may wish to transfer data in VC-4-4c format but would be unable to transport it over current SDH networks which do not support concatenation.

The object of the invention is to provide an SDH network with the capability of carrying signals of increased bandwidth. A further object is to provide for the information content of an STM signal carrying data in contiguously concatenated virtual containers to be transmitted over an SDH network not itself capable of carrying contiguously concatenated signals.

SUMMARY OF THE INVENTION

The present invention provides a method for the transmission of data in a synchronous digital hierarchy (SDH) network comprising the steps of transmitting to a node of the network a form of data signal from outside the network, converting the signal into a virtually concatenated information structure and transporting the signal through the network in the virtually concatenated information structure wherein conversion of the signal comprises processing a path overhead of the signal wherein the integrity of the path overhead information is maintained.

The present invention advantageously provides a method for converting contiguously concatenated signals into virtually concatenated signals for transport in the network.

The present invention provides a means for carrying out either of the above methods.

The present invention also provides a synchronous digital hierarchy (SDH) network in which data is carried in a virtually concatenated information structure, the network comprising tributary cards arranged and configured to process signals received in contiguously concatenated form to convert them into virtually concatenated form for transfer across the network.

In a preferred embodiment the data transfer is achieved by means of a virtually concatenated information structure equivalent to VC-4-4c comprising a set of four virtually concatenated VC-4 signals. This virtually concatenated information structure is referred to in the following by the acronym "VC-4-4vc": this being chosen to reflect the fact that the data rate is the same as that of VC-4-4c, with the "vc" indicating virtual concatenation.

BRIEF DESCRIPTION OF THE DRAWINGS

An embodiment of the invention will now be described by way of example with reference to the accompanying drawings in which.

DETAILED DESCRIPTION OF THE INVENTION

Figure 1:
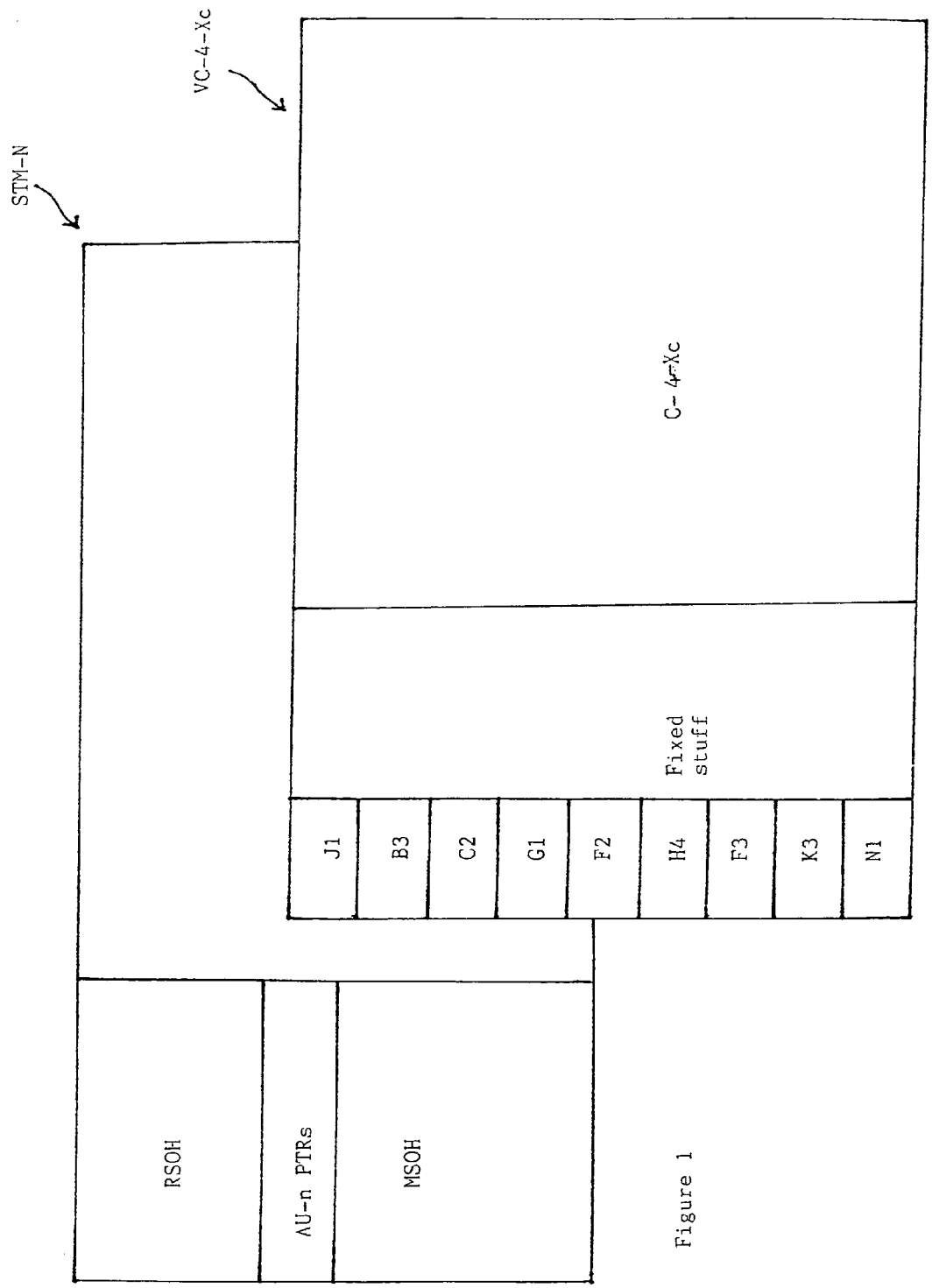
FIG. 1 shows the information structure of a higher order, VC-4 signal of the prior art.

Referring to FIG. 1, this shows synchronous transfer module STM comprising a section overhead SOH, a pointer and a virtual container VC. The VC in turn comprises a path overhead POH, fixed stuff bytes and a container C for the payload.

A network management system manages the transfer of virtually concatenated VC-4's without any modification being required to network equipment. The only hardware modification required is the provision of modified tributary cards capable of identifying the receipt at the network boundary of contiguously concatenated VC-4's and processing them accordingly. Individual VC-4's and virtually concatenated VC-4's are transported in the SDH network in the same way. Hence, four VC-4's, when virtually concatenated, will still have four path overheads.

In the standard configuration a tributary card accepts at its input and delivers at its output an STM-4 signal containing four independent VC-4's (by way of example, each may contain a 140 Mb/s, 3×34 Mb/s or 63×2 Mb/s mapped PDH signals). However, the new tributary card is also capable of accepting at its input and delivering at its output an STM-4 signal containing four contiguously concatenated VC-4 signals: as for example may arise from mapping ATM cells into STM-4 to ITU recommendations I.432 and G.707.

The tributary card will recognise the format of the incoming STM-4 signals: as a contiguously concatenated signal using the concatenation indication in the pointer and act accordingly.

Optionally, the tributary card could also be configured to handle STM-4 signals containing four virtually concatenated VC-4 signals, to meet future demand. The tributary card STM-4 interface meets the requirements of G.957 and G.958. The transport of the ATM/STM-4 signal over the SDH network is transparent and SDH parameters processing and performance monitoring shall apply according to G.826, G.707, G.783 and ETS300 417.

At the ATM/STM-4 input port the pointers of the four concatenated VC-4's are aligned. The resulting, newly generated four VC-4's are processed for transfer across the network as a virtually concatenated information structure (VC-4-4vc) signal by processing their associated path overheads as follows.

Whereas the pointer can indicate delay of the concatenated VC-4's in the VC-4-4vc of up to one frame duration (i.e. 125 μs) higher delays cannot be picked up in this way. Since the differential delay between the VC-4s of a VC-4-4vc as they are transported across the SDH network are unknown, it is necessary to take steps to ensure that the VC-4s so transferred are in the correct sequence. The path trace (J1) value for each of the VC-4's in the VC-4-4vc is given a unique code indicating their order within the VC-4-4vc.

It is also necessary to ensure that the frames of each VC-4 in the VC-4-4vc are correctly ordered. The H4 byte is therefore used for frame sequence indication (FSI) to allow the network to recover the original sequence.

A signal label code is inserted in the C2 byte of each VC-4 of the VC-4-4vc to indicate the payload type, eg an ATM payload, as required. The B3 byte of the received contiguous VC-4-4c signal is processed, as appropriate, to maintain the path integrity. On the back-plane port of the network node which receives the VC-4-4vc signal the virtually concatenated VC-4's of the VC-4-4vc are aligned using a buffer according to the information provided by the path trace values and the frame sequence values. The size of the buffer is dependent on the maximum differential delay allowed between the VC-4's which constitutes the VC-4-4vc. A value of 8 milliseconds is proposed, by way of example, based on the use of the H4 byte to indicate the frame sequence. However such a buffer size may prove prohibitively large. Therefore it may be necessary to reduce the buffer size by ensuring that the differential delay is kept to the absolute minimum. This may be achieved by ensuring that the four VC-4's in the VC-4-4vc are processed and switched together as well as being transmitted together in the same synchronous transfer module (STM), e.g. STM-4, STM-16, STM-64, and along the same route through the network.

Path trace mismatch on any of the VC-4 in the VC-4-4vc will result in trace mismatch defects on the VC-4-4vc signal. Similarly, signal label mismatch and loss of signal (LOS) of any VC-4 in the VC-4-4vc will result in alarm indication signal (AIS) in the VC-4-4vc.

The contents of the pointers, concatenation indicators and path overhead bytes of the contiguous concatenated VC are transported in other bytes or bits in the virtually concatenated VC. Suitable unused bits include some path overhead bytes of the virtually concatenated VC that are assigned to functions not used during virtual concatenation and the fixed stuff bits of the container four (C4) that forms part of the VC-4.

The pointers, concatenation indicators and path overhead bytes must be restored as appropriate before the signal is transmitted as a contiguous signal outside the network. The path overhead information in the first VC-4 frame in the received virtual concatenated VC-4-4vc signal is inserted in the path overhead of the contiguous concatenated VC-4-4c signal generated by the network for transmission outside the network. Additionally, the B3 value is corrected as appropriate to maintain the path's integrity and is inserted in the contiguous VC-4-4c path overhead. Thus the output port delivers an STM signal identical to that presented at the input port.

In a typical system performance reports and alarms would be passed to the element manager (EM). The EM (and SDH network management system) may be required to configure the VC-4's which constitute the VC-4-4vc in a preferred manner.

The invention is not limited to only VC-4-4c or VC-4-4vc. The invention applies to any number of VC-4s (ie. VC-4-nc or nvc where n may be in the range of 2–64 or higher)

The above embodiment is described by way of example only and does not limit the scope of the invention. In particular the present invention applies equally to signals and information structures other than VC-4, for example to VC-3, VC-2 and VC-1. Virtual container signal structures (including VC-4, AU3/VC-3, TU3/VC-3, VC-2 and VC-12) are defined by the ITU, for example in ITU-T G.707 (Draft) 11/95 published 1995.

The arrangement and method of this invention as described above in relation to VC-4 also applies to VC-3 signals. In particular the path overhead of these two signals is exactly similar, allowing the same method for processing of overhead bytes to be used for both types of signal. This applies equally to administrative unit three (AU3) VC-3 as to tributary unit three (TU3) VC-3 signals.

Figure 2:
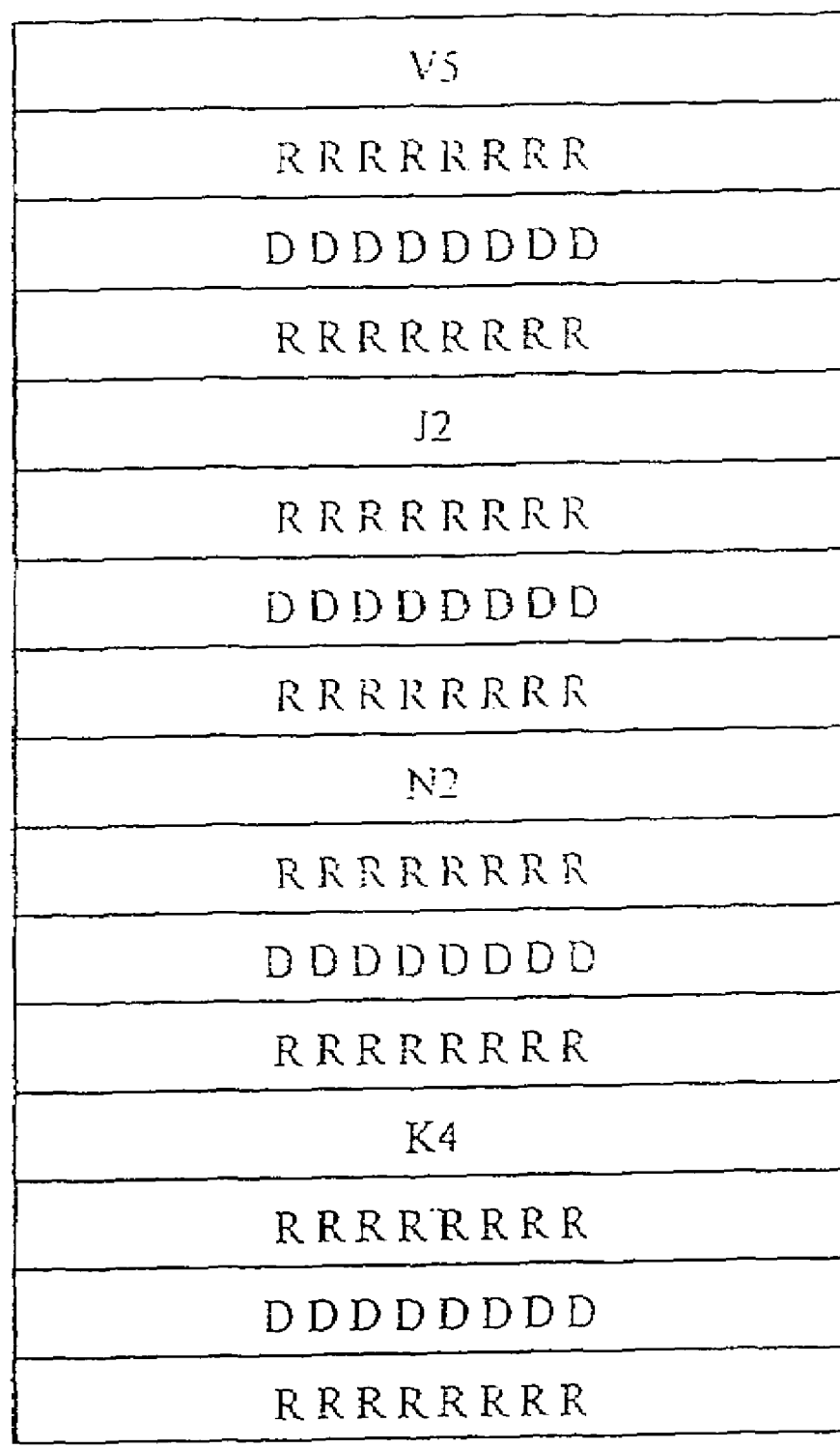
FIG. 2, shows part of the structure of a lower order, VC-2 signal of the prior art.

Referring to FIG. 2, this shows part of the structure of a lower order virtual container VC-2. In FIG. 2 only the first column of the VC-2 is shown to illustrate the positioning of the path overhead (POH) bytes V5, J2, N2 and K4. Also shown are fixed stuff bits R and data bits D. The fixed stuff bits of the first column make up eight whole bytes and other stuff bits and bytes are included in subsequent columns (not shown). The subsequent columns (not shown) comprise further data bits and bytes, together with overhead bits, justification opportunity bits and justification control bits the precise function of which is not relevant to the present disclosure but is detailed in the above ITU-T publication.

Figure 3:
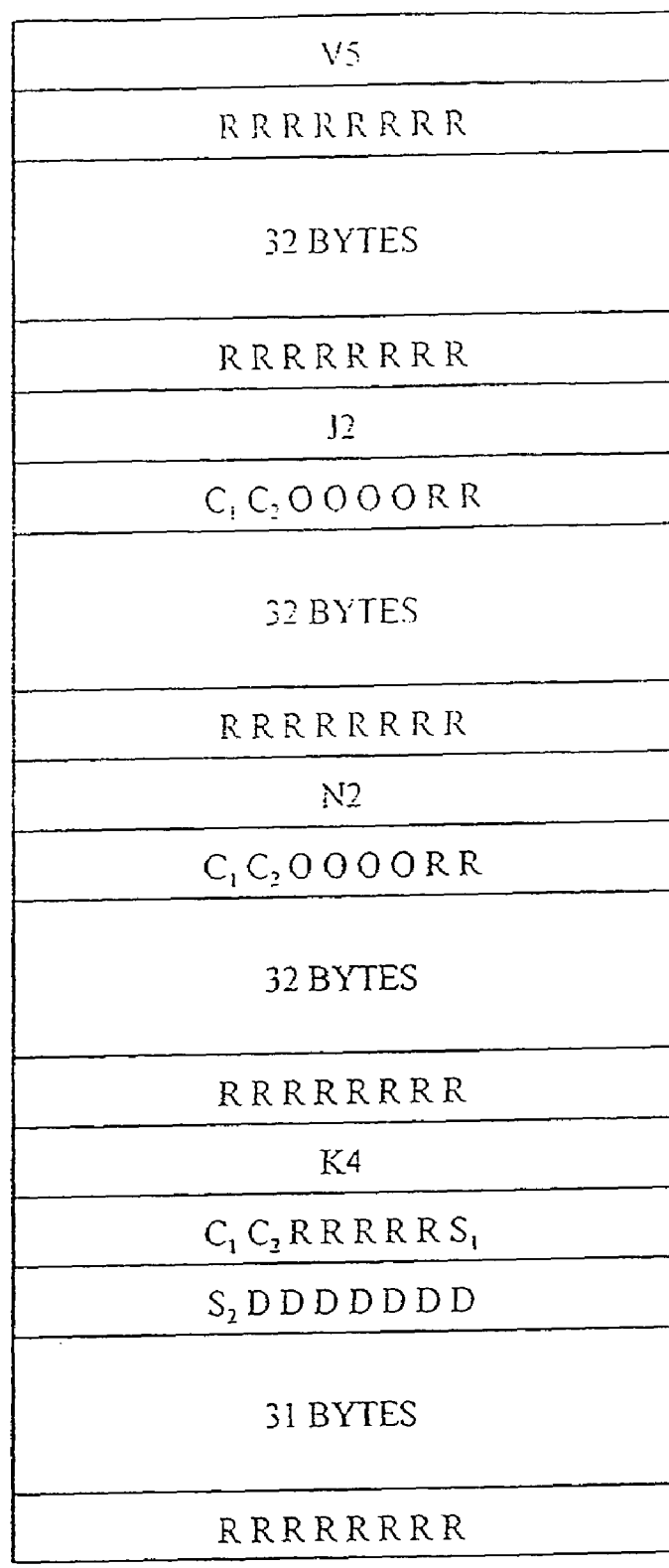
FIG. 3 shows the structure of a lower order, VC-12 signal of the prior art.

Referring to FIG. 3, this shows the structure of a lower order virtual container VC-12 with path overhead (POH) bytes V5, J2, N2 and K4. Data is carried in three units of 32 bytes plus one unit of 31 bytes. Other bytes are variously made up of fixed stuff bytes R, overhead bits O, justification opportunity bits S, justification control bits C and data bits D. The fixed stuff bits R make up five whole bytes and parts of three other bytes with a total of 49 bits. The precise functions of the other bits are not relevant to the present disclosure but are also detailed in the above ITU-T publication.

With lower order VCs (ie VC-2s and VC-1s) the conversion of the path overhead bytes will be slightly different. Accordingly to the invention, the contents of the V5, J2, N2 and K4 overhead bytes of the contiguous concatenated VC-2 and VC-1 signals (e.g. VC-2-5c or VC-12-4c), are transported in other bytes or bits in the virtually concatenated VC-2s/VC-1s. Suitable unused bits are the fixed stuff bits R or overhead bits O. These overhead bytes are restored before the signal is re-transmitted as a contiguous signal outside the network.

Thus VC-4, VC-3, VC-2 and VC-1 can all be transmitted as virtually or contiguously concatenated signals over ATM or PDH networks.

I claim:

1. A synchronous digital hierarchy (SDH) network in which data is carried in a virtually concatenated information structure, the network comprising: tributary interfaces arranged and configured to process at least one first data signal received in a contiguously concatenated information structure and to convert it into the virtually concatenated information structure for transfer across the network, the virtually concatenated information structure comprising a plurality of virtual containers (VC-n) within a concatenated virtual information structure (VC-n-Xvc) in which the first data signal is distributed across the plurality of virtual containers; and conversion means for processing a path overhead (POH) of the first data signal and creating a new POH for each individual virtual container in the virtually concatenated information structure and using a part of the POH to indicate a sequence of frames in the virtually concatenated information structure, in which the integrity of the information in the POH of the first data signal is maintained.

2. The network of claim 1, wherein the tributary interfaces are arranged and configured to process the first data signal transferred across the SDH network in the virtually concatenated information structure and to convert it into a second data signal having the same contiguously concatenated form as that of the first data signal.

3. The network of claim 2, wherein the tributary interfaces comprise at least one buffer for aligning the virtual containers.

4. The network of claim 1, wherein the tributary interfaces are configured and arranged to detect the receipt of the first data signal in the contiguously concatenated form by detecting a concatenation indication of the first data signal.

5. A method of transmitting data in a synchronous digital hierarchy (SDH) network, comprising the steps of:
  a) transmitting to an input port of an ingress node of the SDH network a first data signal from outside the SDH network, the first data signal having concatenated virtual containers;
  b) aligning pointers of the first data signal at the input port;
  c) converting the first data signal into a virtually concatenated information structure that comprises a plurality of the virtual containers within a concatenated virtual information structure;
  d) processing associated path overheads (POHs) of the first data signal by
    i) creating a unique path overhead (POH) value for each of the virtual containers in the concatenated virtual information structure and maintaining path integrity of the first data signal;
    ii) ensuring that all of the virtual containers are transferred in a correct sequence relative to each other; and
    iii) ensuring that frames of each virtual container in the concatenated virtual information structure are correctly ordered; and
  c) transporting the virtually concatenated information structure through the SDH network to an egress node of the network.

6. The method of claim 5, further comprising the step of converting the virtually concatenated information structure at an output port of the egress node of the SDH network back into a second data signal having the same concatenated virtual containers as that of the first data signal by restoring the pointers, concatenation indicators, and POH bytes.

7. The method of claim 6, wherein the concatenated virtual containers of the respective concatenated virtual information structure are aligned at the output port of the egress node according to information derived from the sequence and frame order.

8. The method according to claim 7, wherein a buffer is provided, and the step of aligning the virtual containers uses the buffer.

9. The method of claim 5, wherein the first data signal comprises higher order virtual containers, the POH of the first data signal comprises bytes H4, J1, and B3, the virtual containers in the virtual concatenated information structure comprises a plurality of frames, and the step of processing the POH of the virtual concatenated information structure includes the step of using the H4 byte for indicating a sequence of the frames within the concatenated virtual information structure using the J1 byte to indicate an order of the virtual containers in the concatenated virtual information structure, and correcting, as necessary, error indication information carried by the B3 byte.

10. The method of claim 5, wherein the first data signal comprises lower order virtual containers, the POH of the first data signal comprises bytes V5, J2, N2, and K4, the virtual containers of the virtually concatenated information structure comprises a plurality of frames, and the step of processing the POH of the virtually concatenated information structure includes the step of transporting the V5, J2, N2, and K4 bytes in otherwise unused bytes or bits of the virtually concatenated information structure.

11. The method of claim 10, wherein the otherwise unused bytes or bits are the fixed stuff bits (R) or overhead bits (O).

12. The method of claim 5, comprising the step of converting the virtually concatenated information structure so transported into a second data signal of the same form as the first data signal transmitted to an output port of the node of the SDH network, the converting step including the step of processing the POH of the first data signal by restoring said part of the POH used to indicate the sequence of the frames in the virtually concatenated information structure.

13. The method of claim 5, wherein the first data signal transmitted to the SDH network from outside the SDH network is in contiguously concatenated form.

14. The method of claim 5, wherein the first data signal from outside the SDH network comprises a virtual container four (VC-4) or virtual container three (VC-3) or an administrative unit three (AU3).

15. The method of claim 14, wherein the POH comprises bytes H4, J1 and B3, wherein the VC-4 and VC-3 comprise a plurality of the frames, and the step of processing the POH includes the steps of using byte H4 for indicating the sequence of the frames within the VC-4 or VC-3, using byte J1 to indicate an order of VC-4s or VC-3s in the virtually concatenated information structure, and correcting, as necessary, error indication information carried in byte B3.

16. The method of claim 15, wherein the transmitting step transmits a first concatenated signal in the form comprising four contiguously concatenated VC-4s, and wherein the processing step processes the four VC-4s into the virtually concatenated information structure comprising virtually concatenated VC-4s for transfer across the SDH network.

17. The method of claim 15, wherein the transmitting step transmits a first concatenated signal in the form comprising five contiguously concatenated VC-3s, and wherein the processing step processes the five VC-3 s into the virtually concatenated information structure comprising virtually concatenated VC-3s for transfer across the SDH network.

18. The method of claim 16, comprising the step of aligning the virtually concatenated virtual containers (VCs) of the virtually concatenated information structure using a buffer.

19. The method of claim 18, comprising the step of controlling the aligning step according to contents of bytes J1 and H4.

20. The method of claim 16, comprising the steps of switching and transmitting the VC-4 or VC-3 frames of the virtually concatenated information structure through the SDH network together in a single synchronous transfer module (STM) or in multiple STMs and via a same route.

21. The method of claim 5, wherein the first data signal from outside the SDH network comprises a virtual container two (VC-2) or a virtual container one (VC-1).

22. The method of claim 21, wherein the POH comprises bytes V5, J2, N2 and K4, and wherein the step of processing the POH includes the step of transferring contents of the POH bytes to unused parts of the first data signal.

23. The method of claim 22, wherein the transmitting step transmits the first data signal in the form comprising two or more contiguously concatenated VC-2s or VC-1s, and wherein the processing step processes the VC-2s or VC-1s into the virtually concatenated information structure comprising virtually concatenated VC-2s or VC-1s for transfer across the SDH network.

24. The method of claim 23, comprising the step of aligning the virtually concatenated virtual containers (VCs) of the virtually concatenated information structure using a buffer.

25. The method of claim 24, comprising the step of controlling the aligning step according to contents of the POH byes transferred to the unused parts of the POH of the virtually concatenated information structure.

26. The method of claim 23, in which the contiguously concatenated VC-2s or VC-1s received from outside the SDH network comprise a plurality of the frames in a set sequence, and in which the set sequence of the frames changes while being transported through the SDH network, and comprising the step of re-ordering the frames into the set sequence as required.

27. The method of claim 23, in which the VC-2s and VC-1s comprise a plurality of the frames, and includes the steps of switching and transmitting the VC-2 or VC-1 frames of the virtually concatenated information structure through the SDH network together in a single synchronous transfer module (STM) or in multiple STMs.

28. The method of claim 5, comprising the step of recognizing a receipt of the first data signal in concatenated form by the SDH network.

\* \* \* \* \*

UNITED STATES PATENT AND TRADEMARK OFFICE
CERTIFICATE OF CORRECTION

PATENT NO.       : 7,277,459 B1                                          Page 1 of 1
APPLICATION NO.  : 09/144782
DATED            : October 2, 2007
INVENTOR(S)      : Abbas It is certified that error appears in the above-identified patent and that said Letters Patent is hereby corrected as shown below:

In Column 4, Line 31, delete "higher)" and insert -- higher). --, therefor.

In Column 7, Line 12, in Claim 17, delete "VC-3 s" and insert -- VC-3s --, therefor.

In Column 8, Line 14, in Claim 25, delete "byes" and insert -- bytes --, therefor.

Signed and Sealed this

Fourth Day of November, 2008

JON W. DUDAS
*Director of the United States Patent and Trademark Office*